United States Patent [19]
Thomas

[11] Patent Number: 5,121,569
[45] Date of Patent: Jun. 16, 1992

[54] LAWN EDGING DEVICE

[76] Inventor: James E. Thomas, 2344 W. Harrison St., Chicago, Ill. 60612

[21] Appl. No.: 747,936

[22] Filed: Aug. 21, 1991

[51] Int. Cl.⁵ ......... A01G 1/08; A01C 1/04051216927
[52] U.S. Cl. .............................................. 47/33; 47/56
[58] Field of Search ............... 52/102; 47/33, 32, 14, 47/56; 404/6-8

[56] References Cited

U.S. PATENT DOCUMENTS

| | | | |
|---|---|---|---|
| 2,662,342 | 12/1953 | Peterson | 47/33 |
| 2,865,136 | 12/1958 | Scott et al. | 52/102 |
| 3,098,321 | 7/1963 | Estkowski et al. | 47/56 |
| 3,281,988 | 11/1966 | Cohen | 47/33 |
| 3,378,949 | 4/1968 | Dorris | 47/33 |
| 3,788,001 | 1/1974 | Balfanzo, Jr. | 47/33 |
| 3,841,022 | 10/1974 | Thodos | 47/33 |
| 4,281,473 | 8/1981 | Emalfarb et al. | 47/33 |
| 4,353,183 | 10/1982 | Estkowski | 47/56 |
| 4,644,685 | 2/1987 | Tisbo et al. | 47/33 |
| 4,897,973 | 2/1990 | Foster, Jr. et al. | 52/102 |

Primary Examiner—David A. Scherbel
Assistant Examiner—Michele A. Van Patten
Attorney, Agent, or Firm—Richard W. Carpenter

[57] ABSTRACT

A lawn edging device, for defining borders of lawns and gardens, that is adapted to hold plant seeds, so that when the plants mature their roots will extend through the device and help anchor the device in position in the ground. The device is an elongated article formed of a resilient, extruded, molded plastic material, and it includes a pair of thin vertical wall members that are joined at their lower ends to form a trough-like opening for holding seeds. At least one of the walls have openings at its lower end that allow roots of the plants to pass out of the device as the seeds germinate.

20 Claims, 2 Drawing Sheets

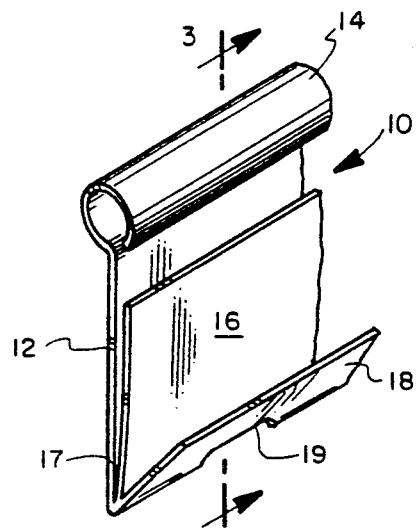
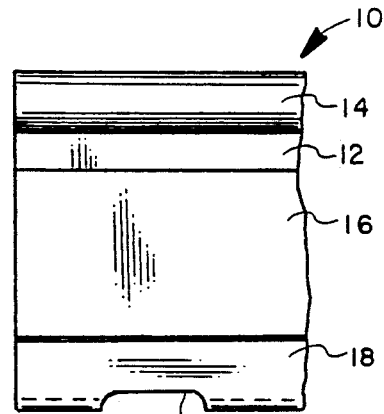
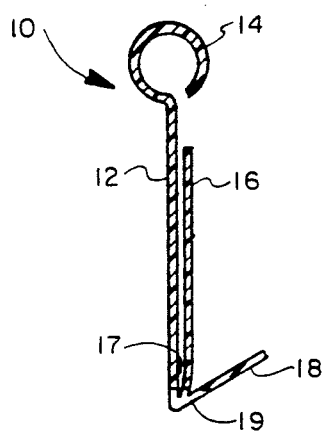
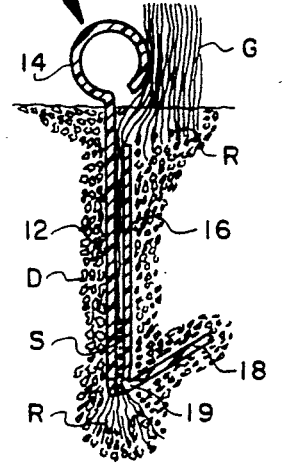
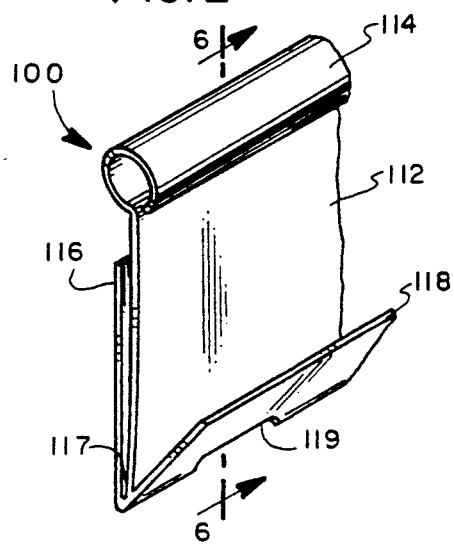
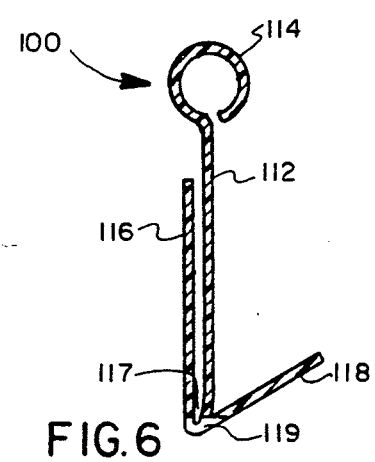
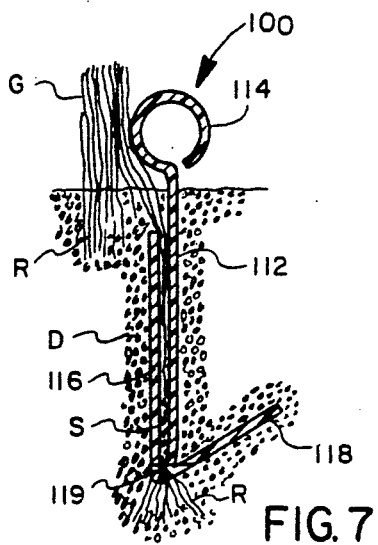

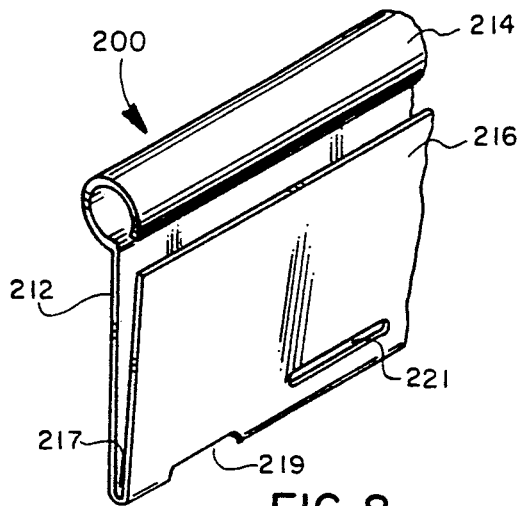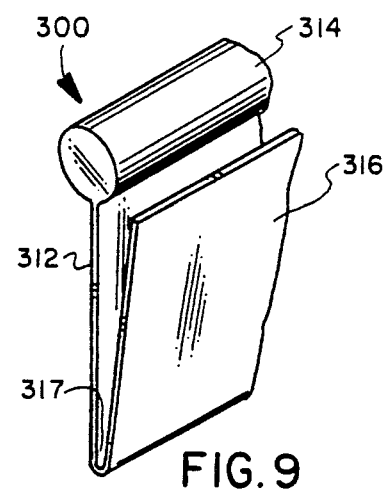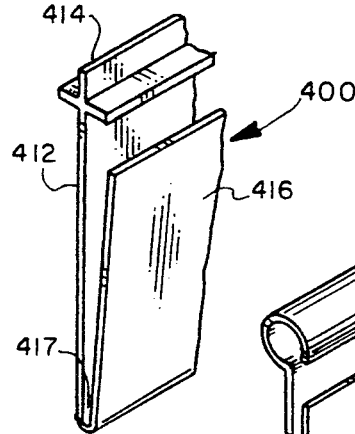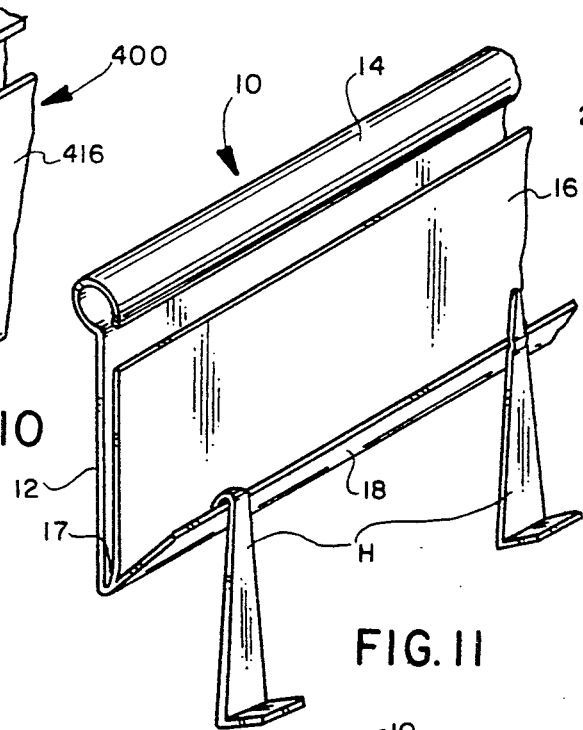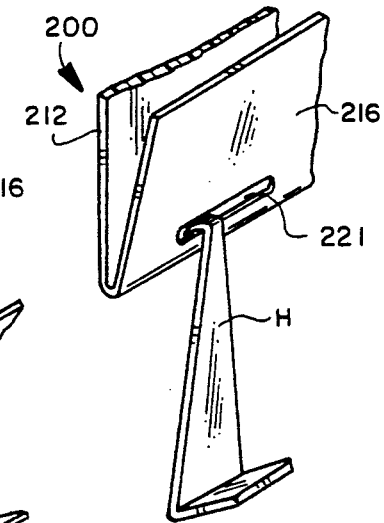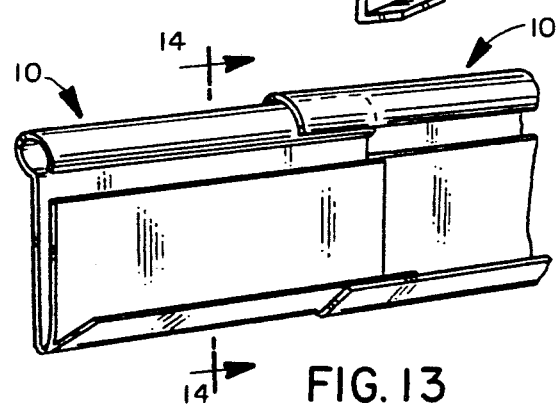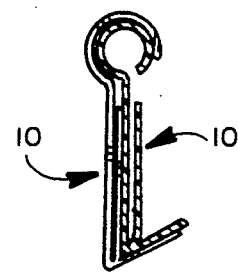

LAWN EDGING DEVICE

BACKGROUND OF THE INVENTION

1. Field of the Invention

This invention relates to lawn edging device of the type used to form borders of lawns and gardens and more particularly to a lawn edging device adapted to hold plant seeds whose roots can serve as anchors to hold the device in the ground after the seeds have germinated and the plants have matured.

2. Description of the Background Art

A background art search directed to the subject matter of this application conducted in the United States Patent and Trademark Office disclosed the following U.S. Pat. Nos.:

| | | | |
|---|---|---|---|
| 2,571,491 | 2,281,927 | 2,812,618 | 3,387,786 |
| 3,472,133 | 3,485,449 | 3,788,001 | 3,841,022 |
| 4,080,755 | 4,281,473 | 4,321,769 | 4,353,183 |
| 4,442,627 | 4,644,685 | 4,761,923 | 4,846,655 |

None of the patents uncovered in the search discloses a lawn edging device comprising a pair of generally parallel, vertical wall members having lower ends joined to each other and defining therebetween a trough-like space, for holding seeds, and having openings extending therethrough that allow roots of plants to pass through the device and into the ground, so that after the seeds have germanated the plant roots will serve as anchors to retain the device in proper position in the ground.

SUMMARY OF THE INVENTION

It is an object of the present invention to provide an improved lawn edging device of the type used to define borders of lawns and gardens.

Another object of the invention is the provision of a device of the type described that has means for anchoring the device in the ground to keep it in position.

A more specific object of the invention is the provision of a lawn edging device comprising a pair of vertical wall members joined at their lower ends to define therebetween a trough-like space for holding plant seeds, and having openings that allow roots of the plants to pass out of the device and into the ground to anchor the device in position after the seeds have germinated and the plants have matured.

These and other objects of the invention will be apparent from an examination of the following description and drawings.

BRIEF DESCRIPTION OF THE DRAWINGS

FIG. 1 is a fragmentary isometric view of a lawn edging device embodying features of the present invention;

FIG. 2 is a side elevational view of the structure illustrated in FIG. 1;

FIG. 3 is a vertical-cross section taken on line 3—3 of FIG. 1;

FIG. 4 is a view similar to FIG. 3, but showing the device positioned in the ground;

FIGS. 5, 6, and 7 are views similar to FIGS. 1, 3, and 4, respectively, but illustrate a modified form of the invention;

FIG. 8 is a view similar to FIG. 1, but illustrates another form of the invention;

FIGS. 9 and 10 are views similar to FIG. 8, but illustrate yet other forms of the invnention;

FIGS. 11 and 12 are views similar to FIG. 1 and FIG. 8, respectively, but illustrate the manner in which an anchoring hook can be attached to the device;

FIG. 13 is an isometric view illustrating the manner in which two similar devices can be attached to each other in telescoping relation; and FIG. 14 is a vertical cross-sectional view taken on line 14—14 of FIG. 13.

It will be understood that, for purposes of clarity, certain elements may have been intentionally omitted from certain views where they are believed to be illustrated to better advantage in other views.

DESCRIPTION OF THE PREFERRED EMBODIMENT

Referring now to the drawings for better understanding of the invention, and particularly to FIGS. 1-4, it will be seen that a lawn edging device embodying features of the invention and indicated generally at 10, is shown placed in the ground surrounded by dirt D.

The device is shown holding plant seeds S. The upper portions of the plants, such as the blades of grass G, are shown extending above the surface the ground, and the roots of the plants are shown extending downwardly and out of the device to anchor the device in the ground.

The device 10 is a generally flexible elongated article that can be formed as a continuous piece by extrusion molding. It can then be cut to desired individual lengths, which before being placed in the ground can be attached to each other in end-to-end telescoping relationship, as illustrated in FIGS. 13 and 14.

Referring now to FIG. 1, it will be seen that the device 10 includes a pair of relatively thin, flat, elongated, first and second vertical wall members 12 and 16, respectively, which are joined at their lower ends and which define therebetween a trough-like opening 17 adapted to receive plant seeds S, as shown in FIG. 4.

At its upper end, first wall member 12 is provided with an integral, preferably tubular, crown or rail 14 which serves to reinforce the device. At its lower end, first vertical wall member 12 has extending outwardly and slightly upwardly therefrom an integral, relatively narrow, thin, flat flange 18, the purpose of which is to serve as a temporary anchor to maintain the device in position in the ground until such time as the roots of the plants have grown large enough to serve as a primary anchor for the device.

In order to afford a means for the roots to escape from the device, there may be provided a plurality of longitudinally spaced openings 19. The openings 19 may be cut through both wall members and the flange, as a convenience in manufacturing; however, it is only necessary that the openings extend through one of the wall members in communication with the trough-like space 17, so that as the seeds germinate the roots can pass out of the device and into the ground.

Referring now to FIGS. 5, 6, and 7 of the drawings, it will be seen that a slightly modified form of the invention is illustrated. In describing this embodiment, as well as the other embodiments hereinafter referred to, portions of the structures which correspond to portions of the structure of the embodiment illustrated in FIGS. 1-4 have been identified with related numerals.

As best seen in FIGS. 5 and 6, this embodiment of the invention is similar to the previously described embodiment, except that flange 118 projects from the opposite side of the first wall member 112 than flange 18 of the previously described embodiment. Again, the first and second vertical wall members 112, and 116, have lower ends joined to each other and form a trough-like opening to 117 therebetween. This embodiment functions in exactly the same manner as the previously described embodiment.

Turning now to FIG. 8 of the drawings, it will be seen that another slightly different form of the invention is shown. In this embodiment edging device 200 does not have any lateral flange at the lower portion thereof. It does, however, comprise a pair of first and second vertical wall members 212 and 216, respectively, that are joined at their lower ends and define therebetween a trough-like space 217 for holding plant seeds.

Like the previously described embodiments, this structure has cut therein a plurality of longitudinally spaced openings 219 that are located at the lower edge of the device and which allow roots of plants to pass out of the device and into the ground.

In the alternate arrangement, also shown in FIG. 8, openings 221 are cut through the wall members. These function in the same manner as openings 219, but are spaced above the lower extremity of the device, so that they may also be used to engage a hook-type anchor H, as illustrated in FIG. 12. Either type of opening may be used, or if desired, both types of openings may be used in the same device.

FIGS. 9 and 10 are views similar to FIG. 8, but illustrate other slightly modified forms of the invention. In each of these embodiments, the structure is the same as that of FIG. 8, except that the crown or rail 314 of FIG. 9 is solid, instead of being tubular, and the crown or rail 414 of the device illustrated in FIG. 10 is formed in the shape of a cross.

FIGS. 11 and 12 are views somewhat similar to FIGS. 1 and 8 and are used to illustrate the manner in which portions of a hook-type anchoring device, indicated generally at H, may be attached to the device. In one embodiment, a portion of the hook is attached to the flange 18, and in the other a portion of the hook extends through opening 221 of the vertical wall members. It is to be understood that the hook-type anchoring device, when employed, would be buried in the ground below the actual lawn edging device.

Again, as previously mentioned, FIGS. 13 and 14 illustrate the manner in which similar lawn edging devices of the type shown in FIGS. 1 through 8 may be attached to each other with marginal portions in telescoping relationship.

Thus, it will be understood that the invention provides a unique lawn edging device that is particularly adapted to hold plant seeds, so that when the plants grow, their roots can extend out of the device and into the ground to serve as a permanent means of anchoring the device in the ground. Until such time as that occurs, the device may be provided with temporary anchoring means such as the flanges previously described.

What is claimed is:

1. A lawn edging device for defining borders of lawns and gardens that is adapted to hold plant seeds, so that when such plants mature their roots will extend through the device and help anchor the device in position in the ground, said device being an elongated article formed of a resilient molded plastic material, comprising:
   (a) a thin, flat, vertical, first wall member having an upper end including an integral reinforcing rail adapted to be positioned above ground and having a lower end adapted to be positioned below ground;
   (b) a thin, flat, generally vertical, second wall member spaced a slight distance from one side of said first wall member in generally parallel relation therewith;
   (c) said second wall member having less height than said first vertical wall member and having a lower end joined to the lower end of said first wall member;
   (d) a thin, generally horizontal, flange member joined to and extending laterally outward from the lower end of said first wall member and being arranged and disposed to help anchor the device in the ground;
   (e) the lower ends of said vertical wall members defining therebetween a trough-like space adapted to hold plant seeds;
   (f) at least one of said wall members having extending therethrough openings in communication with said space to allow roots of said plants to pass through said device as said seeds germinate.

2. A lawn edging device according to claim 1, wherein said flange extends laterally outward from said one side of said first wall member.

3. A lawn edging device according to claim 1, wherein said flange extends laterally outward from the other side of said first wall member.

4. A lawn edging device according to claim 1, wherein said root openings are located at a lower edge of said one wall member.

5. A lawn edging device according to claim 1, wherein said root openings are located a slight distance above a lower edge of said one wall member and are arranged and disposed to receive portions of anchoring hooks.

6. A lawn edging device according to claim 1, wherein said device has a contour in cross-section that will permit a marginal portion of the device to receive a marginal portion of a similiar device in telescoping relationship.

7. A lawn edging device for defining borders of lawns and gardens that is adapted to hold plant seeds, so that when such plants mature their roots will extend through the device and help anchor the device in position in the ground, said device being an elongated article formed of a resilient molded plastic material, comprising:
   (a) a thin, flat, vertical, first wall member having an upper end including an integral reinforcing rail adapted to be positioned below ground;
   (b) a thin, flat, generally vertical, second wall member spaced a slight distance from one side of said first wall member in generally parallel relation therewith;
   (c) said second wall member having less height than said first vertical wall member and having a lower end joined to the lower end of said first wall member;
   (d) the lower ends of said vertical wall members defining therebetween a trough-like space adapted to hold plant seeds;
   (e) at least one of said members having extending therethrough openings in communication with said space to allow roots of said plants to pass through said device as said seeds germinate.

8. A lawn edging device according to claim 7, and including a thin, generally horizontal, flange member joined to and extending laterally outward from the lower end of said first wall member and being arranged and disposed to help anchor the device in the ground.

9. A lawn edging device according to claim 8, wherein said flange extends laterally outward from said one side of said first wall member.

10. A lawn edging device according to claim 8, wherein said flange extends laterally outward from the other side of said first wall member.

11. A lawn edging device according to claim 7, wherein said root openings are located at a lower edge of said one wall member.

12. A lawn edging device according to claim 7, wherein said root openings are located a slight distance above a lower edge of said one wall member and are arranged and disposed to receive portions of anchoring hooks.

13. A lawn edging device according to claim 7, wherein said device has a contour in cross-section that will permit a marginal portion of the device to receive a marginal portion of a similiar device in telescoping relationship.

14. A lawn edging device for defining borders of lawns and gardens that is adapted to hold plant seeds, so that when such plants mature their roots will extend through the device and help anchor the device in position in the ground, said device being an elongated article formed of a resilient molded plastic material, comprising:

(a) a thin, flat, vertical, first wall member having an upper end adapted to be positioned above ground and having a lower end adapted to be positioned below ground;

(b) a thin, flat, generally vertical, second wall member and having a lower end joined to the lower end of said first wall member;

(c) the lower ends of said vertical wall members defining therebetween a trough-like space adapted to hold plant seeds;

(d) at least one of said members having extending therethrough openings in communication with said space to allow roots of said plants to pass through said device as said seeds germinate.

15. A lawn edging device according to claim 14, and including a thin, generally horizontal, flange member joined to and extending laterally outward from the lower end of said first wall member and being arranged and disposed to help anchor the device in the ground.

16. A lawn edging device according to claim 15, wherein said flange extends laterally outward from said one side of said first wall member.

17. A lawn edging device according to claim 15, wherein said flange extends laterally outward from the other side of said first wall member.

18. A lawn edging device according to claim 14, wherein said root openings are located at a lower edge of said one wall member.

19. A lawn edging device according to claim 14, wherein said root openings are located a slight distance above a lower edge of said one wall member and are arranged and disposed to receive portions of anchoring hooks.

20. A lawn edging device according to claim 14, wherein said device has a contour in cross-section that will permit a marginal portion of the device to receive a marginal portion of a similiar device in telescoping relationship.

* * * * *